United States Patent [19]

Henriksen

[11] Patent Number: 4,752,306
[45] Date of Patent: Jun. 21, 1988

[54] METHOD AND APPARATUS FOR TREATING LIQUID/GAS MIXTURES

[75] Inventor: Norolf Henriksen, Notodden, Norway

[73] Assignee: Norsk Hydro a.s., Oslo, Norway

[21] Appl. No.: 939,440

[22] Filed: Dec. 4, 1986

[30] Foreign Application Priority Data

Feb. 13, 1986 [NO] Norway ............................ 860520

[51] Int. Cl.⁴ ............................................ B01D 19/00
[52] U.S. Cl. ........................................... 55/38; 55/51; 55/53; 55/196
[58] Field of Search ................. 55/38, 39, 40, 41, 44, 55/46, 49, 51–54, 159, 196, 257 R, 257 C

[56] References Cited

U.S. PATENT DOCUMENTS

| | | | |
|---|---|---|---|
| 1,725,925 | 8/1929 | Kent | 55/46 |
| 2,249,884 | 7/1941 | Carney | 55/44 |
| 2,560,978 | 7/1951 | Persson et al. | 210/16 |
| 2,582,885 | 1/1952 | Rosenblatt | 23/2 |
| 2,720,280 | 10/1955 | Doyle | 55/46 |
| 3,535,074 | 10/1970 | Nakashima | 23/2 |
| 4,017,276 | 4/1977 | Bloem | 55/51 |
| 4,370,151 | 1/1983 | Herbrechtsmeier | 55/51 |

FOREIGN PATENT DOCUMENTS

| | | | |
|---|---|---|---|
| 531386 | 10/1956 | Canada . | |
| 596536 | 4/1960 | Canada . | |
| 1531537 | 11/1978 | United Kingdom | 55/53 |
| 857356 | 8/1981 | U.S.S.R. . | |

OTHER PUBLICATIONS

Dunbar, R. E., *General Chemistry*, Littlefield, Adams & Co. (1964), pp. 22–23.

Primary Examiner—Bernard Nozick
Attorney, Agent, or Firm—Wenderoth, Lind & Ponack

[57] ABSTRACT

Provided is a system for treatment of and mass transfer in liquid/gas mixtures, especially removal of oxygen from seawater to be injected into deep structures to increase the production of underground hydrocarbon resources. The oxygen removal is performed by an inert stripping gas which is purified and regenerated before it is recirculated. The liquid and the gas are pumped in turbulent concurrent flow with the inert gas through one or more tube-like zones to one or more separation zones where the gas and liquid are separated. The liquid is led to the next treatment stage, while the stripping gas is returned to the prior treatment stage. The liquid flow and the gas flow are pumped and controlled independently of each other. This provides freedom to obtain optimal treatment conditions and correct amounts of transported liquid.

6 Claims, 1 Drawing Sheet

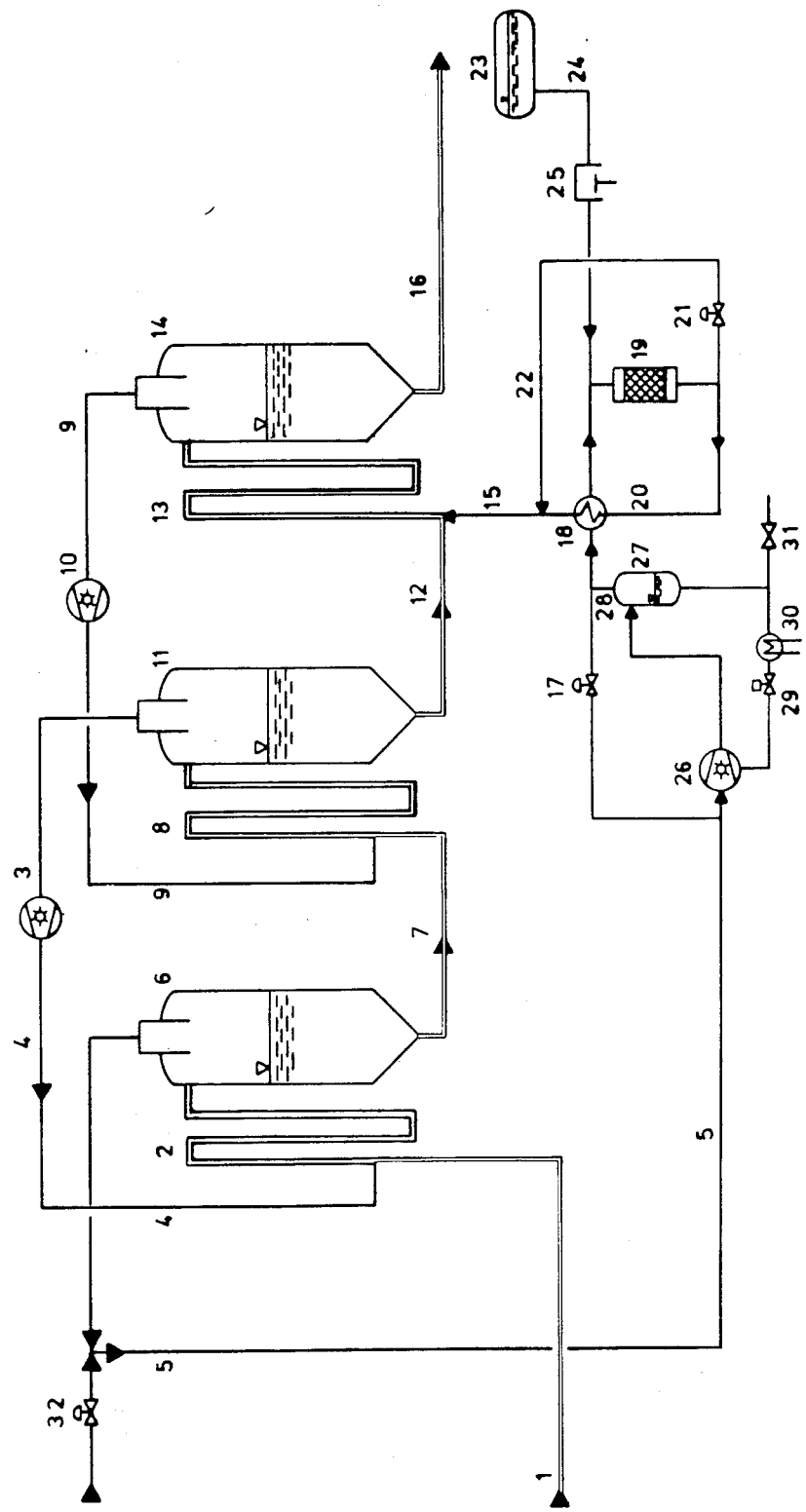

METHOD AND APPARATUS FOR TREATING LIQUID/GAS MIXTURES

BACKGROUND OF THE INVENTION

The present invention relates to the treatment of and mass transfer in mixtures of liquid and gases.

In such methods liquid and gas are brought into contact with each other to provide mass transfer between the phases. Subsequently the phases are separated.

From Norwegian Pat. No. 152,209 is known a method where an inert gas is employed to separate an unwanted gas from a gas/liquid mixture by stripping. The inert gas is separated from the liquid, regenerated and purified in the gaseous state by means of a catalyst and thereafter recirculated. The liquid is transported by simultaneously pumping and stripping utilizing a so-called "gas lift effect" through a vertical tube.

Utilizing the gas lift principle for pumping and mass transfer in a vertical tube, a flow pattern for gas and liquid is created and this pattern will vary within the tube. By choosing an optimal gas volume to obtain satisfactory mass transfer in a tube of a length of 100 m, it was found that an increase in the amount of gas beyond the optimal functioning of the gas lift effect was not advantageous. A further increase of the gas volume resulted in ring flow in significant areas of the tube and reduced effectively the total liquid flow and the gas lift effect. Therefore there is no freedom available to choose gas/liquid ratios which results in both optimal mass transfer and efficient pumping simultaneously.

SUMMARY OF THE INVENTION

Thus, it is an object of the present invention to provide a method and apparatus for gas/liquid treatment whereby it is possible to establish conditions for gas/liquid contacts with freedom to choose the gas/liquid ratios giving a desired transported amount of liquid and simultaneously optimal mass transfer.

It is a further object of the invention to provide a multistage method and apparatus utilizing a gasflow from one stage to the next in counterflow to the liquid, this reducing the circulating gas volume and increasing the relative amount of mass transfer in the gas.

An additional object of the invention is to provide a gas recirculation stage with heat exchange, for thereby freely regulating and controlling the temperature in a catalyst which is used for regeneration and purification of the circulating gas. Hereby a greater freedom for choice of the temperature in the catalyst bed is obtained.

These and additional objects of the invention are obtained with the method and apparatus which are described below, and the invention is characterized and defined by the accompanying claims.

BRIEF DESCRIPTION OF THE DRAWING

Additional features of the invention are described in more detail below with reference to the accompanying drawing, where:

The single FIGURE is a schematic view of a preferred embodiment of a system according to the invention.

DETAILED DESCRIPTION OF THE INVENTION

Thus, the drawing shows a multi-stage system which is used to remove oxygen, or a first gas, from seawater and utilizing nitrogen as a treating, or a second, gas. Such an embodiment of a multi-stage system requires at least one compressor for gas circulation. Seawater containing oxygen is pumped by means of a conventional low pressure water pump or the like through a pipeline 1 to a first treatment stage 2,6.

Depending upon design parameters the system may require the use of pumps for controlled supply of liquid in every treatment stage. Such pumps, however, are not shown in the drawing, which is a schematic flow sheet. Each stage includes a tube 2, 8, 13 of unobstructed interior and constant inner diameter, and formed as a hair pin with vertically extending legs. The gas/liquid mixture leaves the tube 2 and enters a subsequent gas/liquid separator 6 of traditional design.

Gas from a subsequent treatment stage is pumped by means of a compressor 3 under pressure into the tube 2 through a pipeline 4. The gas/liquid mixture from the tube 2 thereafter enters the gas/liquid separator 6, where gas is separated in the upper part and seawater is collected in the lower part. The gas is led through a tube 5 to a gas purification- and recirculation system, which will be described in detail below. The seawater which is treated in the first stage is led through a pipeline 7 to the next treatment stage which consists of tube 8 and a gas/liquid separator 11. This treatment stage corresponds to the first, and the tube 8 is supplied with gas through a pipeline 9 coming from a subsequent stage by a compressor 10. The liquid/gas mixture is passing through the tube 8 to the subsequent liquid/gas separator 11. The separated gas is led, as mentioned above, back to the first treatment stage, while the liquid from the bottom of the separator 11 is led through a pipeline 12 to third tube 13 which is designed similarly to the previous tubes. At this stage, purified or otherwise treated gas is supplied through a pipeline 15. The tube 13 is connected to a third liquid/gas separator 14 and the treated, purified liquid is led from the bottom of the separator 14 and through a pipeline 16.

The positive pumping of the liquid through the different treatment stages and the circulation of gas by means of compressors 3, 10, makes it possible to return the gas to the tubes under pressure and also freely to control or regulate the ratio of liquid/gas. If the pressures in the different separators are conveniently chosen, a compressor between each of the stages will not be necessary.

When the gas- and liquid streams are led through the tubes, they will mix efficiently because the liquid and gas are pumped independently of each other and one has freedom to choose liquid/gas ratios as well as optimal liquid/gas velocities. In practice this is done by regulating the liquid/gas ratios until near to ideal two-phase gas/liquid turbulent flow velocities are obtained. To ascertain that all the gas which is led into the last tube is completely purified and free of oxygen, the system is equipped with a gas recirculation system which includes a deoxidization unit with a precious metal catalyst.

The impure stripping gas is led through the pipeline 5 via a compressor 26, a gas/liquid separator 27 and a pipeline 28 to a heat exchanger 18 provided in a gas regenerating stage. This includes a catalyst unit 19 with a chamber filled with dry, granular catalyst containing active palladium or platina. Purified, regenerated treating gas is led via a pipeline 20 through the heat exchanger 18 and will thus give off heat which is transferred to the incoming contaminated stripping gas which via the pipeline 28 is passed through the heat exchanger 18 to the catalyst unit 19. Purified gas can also be led directly to the tube 13 via a valve 21 and a separate pipeline 22. This makes it possible to accurately regulate the temperature of the contaminated gas which is to be purified by deoxidization. Pure hydrogen gas may be used for reaction with oxygen in the catalyst unit.

With the possibility for temperature regulation by means of the above mentioned heat exchanger, whereby it is possible to establish any desired temperature, there is an opportunity to employ other reduction means than hydrogen gas. Thus, the drawing shows a tank 23 with liquid methanol which via a pipeline 24 and a level indicator 25 is led directly into the catalyst unit 19, where it reacts with the oxygen on the catalyst.

To remove salt containing vapour from the contaminated treatment gas, a scrubbing system is provided in front of the catalyst unit 19, wherein the gas, by the means of liquid ring compressor 26, is scrubbed and led to gas/liquid separator 27. The liquid is, via a liquid cooler 30 and a valve 29, circulated back to the compressor 26. The gas/liquid separator 27 is provided with gas pipeline 28 which is connected to the heat exchanger 18.

Vapour which is condensed due to compression or cooling is tapped off from the gas/liquid separator 27 through a valve 31. By means of a valve unit 32, new fresh nitrogen or possibly air may be added to the system to replace gas absorbed by the treated water.

EXAMPLE

To illustrate the efficiency of this new stripping system, we have compared the prior known gaslift system according to Norwegian Pat. No. 152,209 with the system according to the invention, which is described above and shown in the drawing. Both systems were used to remove oxygen from seawater. The diameters of the treatment tubes were identical, and each system was supplied with pure nitrogen from the same source.

The following results were obtained with seawater:

|  | Gaslift system | Hair pin system (one-stage) |
| --- | --- | --- |
| Zone length, m | 40 | 13 |
| Residence time, sec. | 12 | 4 |
| Result: |  |  |
| $O_2$-content | 0.10 ppm | 0.10 ppm |

Thus, compared to the gaslift treatment, the length of the treatment zone as well as the residence time may be reduced to a third, and still the same efficiency is obtained.

Compared to conventional stripping in filled towers or columns the improvements will be considerably greater, and in addition significant equipment weight savings will be obtained.

The invention makes it possible to obtain and maintain conditions for gas/liquid treatment with practically unlimited interfacial interaction. Furthermore, liquid contaminants can be removed from a gas phase or gas contaminants removed from a liquid phase.

Additionally the invention can be utilized both for the removal of oxygen from a liquid phase and for the enrichment of oxygen to a liquid phase. In the latter case, oxygen is circulated through the system instead of inert gas. Other gases, like $CO_2$ and $H_2S$, can also be removed or can be added.

Above is described a preferred embodiment of the apparatus. There are several alternatives to this. A number of parallel tubes can be placed side by side functioning as a tube set. The tubes can be curved or undulated resulting in a wave- or sinus-like configuration. Additional mechanical pumps can also be employed to maintain the liquid velocities at the desired levels. Because the system according to the invention makes it possible to increase the temperature in the gas/regeneration stage, also other reduction means than hydrogen, e.g. methanol or natural gas, can be employed.

I claim:

1. In a method for treating a mixture of a liquid and a first gas to separate said first gas from said liquid by mass transfer with a second gas, wherein said mixture and said second gas are passed in co-current flow through treatment zones of a plurality of treatment stages, during which mass transfer occurs between said first and second gases and the liquid, and then are passed into gas-liquid separators of corresponding respective ones of said treatment stages to thereby separate said liquid from said gases, the improvement comprising optimizing the mass transfer in said treatment zones by:

providing said treatment zones as unobstructed tube-shaped members of constant diameter;

pumping said liquid seriatim in a downstream direction through said plural treatment stages and separators;

pumping pure said second gas into said treatment zone of the downstream treatment stage, and thereby effecting mass transfer therein;

pumping said gases separated in each said gas-liquid separator, except the most upstream said gas-liquid separator, in an upstream direction to said treatment zone of an upstream treatment stage, and thereby effecting therein mass transfer; and controlling said pumping of said pure second gas and said pumping of said separated gases separately and independently of said pumping of said liquid, and thereby controlling separately the amounts and velocities of said liquid and said second gas in said treatment zones.

2. The improvement claimed in claim 1, further comprising regenerating said second gas separated in said most upstream gas-liquid separator, and supplying the thus regenerated said second gas as said pure second gas to said treatment zone of said downstream treatment stage.

3. The improvement claimed in claim 2, wherein said regenerating comprises pumping said gases separated in said most upstream gas-liquid separator through a heat exchanger in indirect heat exchange with heated regenerated said second gas and then through a gas regeneration and purification system to form said heated regenerated second gas as the pure gas.

4. In an apparatus for treating a mixture of a liquid and a first gas to separate the first gas from the liquid by mass transfer with a second gas, said apparatus including a plurality of treatment stages each including a treatment zone through which are passed in co-current flow the mixture and the second gas, during which mass transfer occurs between the first and second gases, and a gas-liquid separator within which the liquid is separated from the gases, the improvement comprising means for optimizing said mass transfer, said optimizing means comprising:

each said treatment zone being in the form of an unobstructed tube-shaped member of constant diameter;

means for pumping the liquid seriatim in a downstream direction through said plural treatment stages;

means for pumping pure second gas into said treatment zone of the downstream treatment stage, whereby mass transfer is effected therein;

means for pumping the gases separated in each said gas-liquid separator, except the most upstream said gas-liquid separator, in an upstream direction to said treatment zone of an upstream treatment stage, whereby mass transfer is effected therein; and said means for pumping the pure second gas and said means for pumping the separated gases being controlled separately and independently of said means for pumping the liquid, thereby forming means for controlling separately the amounts and velocities of the liquid and the second gas in said treatment zones.

5. The improvement claimed in claim 4, further comprising means for regenerating the second gas separated in said most upstream gas-liquid separator and for supplying the thus regenerated second gas as the pure second gas to said treatment zone of said downstream treatment stage.

6. The improvement claimed in claim 5, wherein said regenerating means comprises heat exchanger means, gas regeneration and purification means, and means for pumping the gases separated in said most upstream gas-liquid separator through said heat exchanger means in indirect heat exchange with heated regenerated second gas and then through said gas regeneration and purification means for forming the heated regenerated second gas as the pure gas.

* * * * *